United States Patent
De Rooy et al.

[15] 3,691,729
[45] Sept. 19, 1972

[54] PROCESS AND APPARATUS FOR THE RECOVERY OF AMMONIA AND CARBON DIOXIDE FROM THE TAIL GAS OF A UREA SYNTHESIS

[72] Inventors: Michael A. De Rooy; Johan D. Logemann; Henricus A. A. Koenders, all of Geleen, Netherlands

[73] Assignee: Stamicarbon N.V., Heerlen, Netherlands

[22] Filed: May 26, 1971

[21] Appl. No.: 147,055

[30] Foreign Application Priority Data

May 30, 1970 Netherlands..............7007873

[52] U.S. Cl. .............................55/70, 55/93, 55/222
[51] Int. Cl. .............................................B01d 53/00
[58] Field of Search ............55/68, 70, 227; 252/372; 260/555 A

[56] References Cited

UNITED STATES PATENTS

| | | |
|---|---|---|
| 3,155,722 | 11/1964 | Mavroic..................260/555 A |
| 3,258,486 | 6/1966 | Cook......................260/555 A |
| 3,488,293 | 1/1970 | Hong et al. ...............252/372 |

FOREIGN PATENTS OR APPLICATIONS

| | | |
|---|---|---|
| 1,124,868 | 8/1968 | Great Britain.........260/555 A |

*Primary Examiner*—Reuben Friedman
*Assistant Examiner*—R. W. Burks
*Attorney*—Cushman, Darby & Cushman

[57] ABSTRACT

A process and apparatus for the recovery of ammonia and carbon dioxide from urea synthesis tail gas is disclosed, wherein the tail gas is intensively contacted with an aqueous media in at least one absorption zone, as is known to the art, and thereafter the gas mixture leaving such absorption zone is immediately mixed with a gas which is inert to the constituents of the tail gas. The apparatus involves a gas bubble washer and an intensive gas-liquid contactor, with means for supplying inert gas overlying such contactor. By the use of the present invention the possibility of forming an explosive mixture of the gases leaving the absorption zone is eliminated, or at least minimized.

12 Claims, 4 Drawing Figures

PROCESS AND APPARATUS FOR THE RECOVERY OF AMMONIA AND CARBON DIOXIDE FROM THE TAIL GAS OF A UREA SYNTHESIS

BACKGROUND OF THE PRIOR ART

In modern urea synthesis manufacturing processes the synthesis of urea from ammonia and carbon dioxide is conducted under a high pressure and at a high temperature in a two-step reaction. First, the ammonia and the carbon dioxide are converted into ammonium carbamate according to the reaction equation:

$$2 NH_3 + CO_2 \leftrightarrows NH_2cCOONH_4 \quad (1)$$

followed by the formation of urea from the ammonium carbamate with the loss of water, according to the reaction equation:

$$NH_2COONH_4 \leftrightarrows CO(NH_2)_2 + H_2O \quad (2)$$

Reaction (1) above proceeds spontaneously into completion, provided the liberated heat of reaction is removed at an adequate rate. Reaction (2), on the other hand, is an equilibrium reaction, which is endothermic to the right. The percentage of ammonium carbamate converted into urea depends, among other things, upon the reaction conditions, the molecular ratio of ammonia-carbon dioxide, and the water content of the reaction mixture. It will be appreciated from the reaction equation (2) that the conversion efficiency is proportionally lower as the water content increases.

The urea formed in the above synthesis is conventionally separated from the synthesis solution discharged from the synthesis reactor, which solution also contains ammonium carbamate, as well as water and excess ammonia. Generally the separation of the reaction products is carried out in a plurality of steps including decomposition of the ammonium carbamate, removal of the ammonia and the carbon dioxide which will then be present, and finally removal of the remaining water. The ammonia and carbon dioxide which are separated from the synthesis solution may be processed into by-products, such as ammonium nitrate or ammonium sulfate, but usually these reaction components are recycled to the urea synthesis section.

One known ammonia and carbon dioxide recycling process involves heating the synthesis solution formed in the synthesis reactor in a number of pressure stages, for instance, two stages, at 10 – 30 atmospheres pressure and 2 – 5 atmospheres pressure, respectively to dissociate the ammonium carbamate and expel the liberated ammonia and carbon dioxide. The unconverted reaction components are subsequently absorbed in an aqueous media and the resulting solution is returned to the urea synthesis reactor. In another known process, the unconverted ammonium carbamate is decomposed and the major proportion of the liberated ammonia and carbon dioxide are expelled by stripping the synthesis solution at the synthesis pressure with the application of heat and the aid of gaseous ammonia or carbon dioxide or an inert gas. The gas mixture so obtained is condensed and absorbed in an aqueous media, still under the synthesis pressure. The ammonium carbamate solution so formed is then recycled to the synthesis reactor, and any ammonia and carbon dioxide remaining in the stripped synthesis solution is recovered in a lower pressure separation and may be recirculated to the high pressure stage.

The ammonia and the carbon dioxide used in the preparation of urea usually contain, although this is dependent upon the manner in which they are produced, small quantities of other gases, such as hydrogen, nitrogen, carbon monoxide and, in some cases, methane, which other gases may be in the gaseous state or in the dissolved state. These other gases do not take part in the formation of urea, and, in the case of recycle processes, would in the long run accumulate in the synthesis reactor or in other parts of the urea synthesis plant, where they would detrimentally influence the process efficiency. It is therefore necessary for these inert gases to be discharged from the urea synthesis plant, and this necessarily involves the discharge of ammonia and carbon dioxide therewith, with the quantities of ammonia and carbon dioxide discharged determined by the particular temperature and pressure utilized. It is possible to recover these valuable constituents, i.e. ammonia and carbon dioxide, from the mixture thereof with the aforesaid inert gases, which mixture is normally designated the tail gas mixture, by absorption in aqueous media such as water, aqueous ammonia solutions or aqueous urea solutions. The ammonia and carbon dioxide so recovered are ultimately returned in the dissolved state to the urea synthesis reactor, where they again participate in the urea synthesis. As mentioned previously, water unfavorably influences the formation of urea from ammonium carbamate, and therefore the absorption should be conducted at as high a pressure as possible, in order to keep the required quantity of aqueous media to a minimum.

It is known to the art to use titanium or corrosion resistant steel apparatus and lines, or apparatus and lines lined with such materials, in the urea synthesis plant. In order to prevent these materials from being corroded, a small quantity of air or oxygen is generally added to the system, normally by addition to the carbon dioxide or by a separate supply. The oxygen or air which passes through the urea synthesis plant, and is not used to maintain the passive conditions of the metal surfaces that are subject to corrosion, joins, at least in part, the inert gases mentioned above, and should also be discharged from the urea synthesis plant.

When ammonia and carbon dioxide are absorbed from the tail gas mixture also containing the above-mentioned inert gases, the concentration of these inert gases in the remnant gaseous phase, i.e. the tail gas residue after removal of at least part and generally substantially all, ammonia and carbon dioxide from the tail gas, naturally changes. It is possible, particularly during transitional situations such as at start-up or shut-down of the particular installation, for the composition of the remnant tail gas mixture to become such that explosions occur, with the explosions generally caused by the reaction of oxygen with, for instance, hydrogen or other combustible constituents of the inert gas mixture present, or possibly with ammonia present in the inert gas mixture. Such explosions involve very rapid increases of pressure to about 10 times the operating pressure of the wash column. When designing the apparatus, suitable allowances can be made for the possibilities of explosions, but if the absorption is carried out at substantially synthesis pressure, the absorber and the lines and accessories connected thereto should be resistant to pressures of 1,500 – 3,000 atmospheres. Such high pressure construction is extremely expensive and undesirable.

It has been proposed to remove hydrogen from the inert gas mixture because of the fact that for hydrogen-free inert gas mixtures, the ammonia, carbon dioxide and oxygen concentrations can be three to four times as high as that of similar, hydrogen-containing mixtures before such explosive reactions occur. The prior removal of the hydrogen from the feed carbon dioxide, for instance, by catalytic combustion, has been proposed, but this treatment does not lead to complete removal of the hydrogen and, moreover, again is rather expensive.

In the process described in British Chemical Engineering 13 (1968), No. 10, pages 1,368a to 1,368c inclusive, only a partial condensation and, possibly, absorption of the reaction components admixed with the inert gases is effected under the urea synthesis pressure. The remaining gas mixture, still containing large quantities of ammonia and carbon dioxide, is then expanded to atmospheric pressure and passed through an absorption column, wherein practically all of the ammonia and carbon dioxide still present is dissolved in the process condensate. During the time that the ammonia and carbon dioxide are washed out of this column, tee remaining gas mixture may fall within the explosive limits. Although the risk of explosion is more limited among other things, as a result of the lower temperatures utilized, for safety reasons the absorption column must be capable of withstanding a pressure which is ten times as high as the operating pressure. A disadvantage of this process is that the resulting solution contains a large quantity of water, so that direct recirculation to a high pressure urea synthesis autoclave would result in an appreciable decrease of the conversion efficiency, and an increase of the steam consumption for the decomposition of the unconverted ammonium carbamate and the expulsion of the ammonia and carbon dioxide liberated thereby. This may be reduced, but not altogether avoided, by desorbing the solution at a pressure of a few atmospheres and by absorbing the liberated mixture of ammonia, carbon dioxide and water vapor in a diluted ammonium carbamate solution. This step calls for a separate absorption column and hence involves extra investment and operating costs. An additional substantial disadvantage is that the absorption heat becomes available in this system at a low temperature level and offers no possibilities of application in the urea synthesis plant.

DESCRIPTION OF THE INVENTION

The present invention provides a process in which the disadvantages mentioned above of the prior art processes are avoided, while the risk of explosive reactions in the tail gas remnant is eliminated or at least is highly reduced. The tail gas is intensively contacted with aqueous media in at least one absorption zone as is conventional in tail gas washing. According to the present invention, the remnant gas mixture leaving the last absorption zone is immediately mixed with a gas which is inert to the constituents of the tail gas in an amount such as to place the concentration of the tail gas outside of the explosive range, or an amount which is at least 10 percent of the aforesaid amount, with lower concentrations of inert gas utilized in conjunction with a buffer space as described hereinafter.

In some cases it may be objectionable to completely eliminate the possibility of an explosion, i.e. it may be undesirable to change the concentration of the constituents of the remnant tail gas to completely outside of the explosive limits, because of the greater quantity of inert gas necessary to change the composition of certain remnant tail gas mixtures in such a way that the composition of the gas no longer lies within the explosive range. For this reason, therefore, preference is given to an embodiment of the process of this invention wherein the inert gas is supplied to the area immediately above the last absorption zone from a buffer zone filled with such inert gas and at least partially surrounding said last absorption zone. The buffer zone should be of such a gaseous volume that it is capable of absorbing the rapid increase in pressure which occurs as a result of explosive reactions in the remnant tail gas mixture. In practice, this will generally means that the maximum pressure rise in the absorption device may amount to only a few tenths of a percent.

As mentioned above, the wash column will normally be operated at substantially the urea synthesis autoclave pressure, which normally will be at least about 125 atmospheres and generally will not be higher than about 350 atmospheres. Preferably, the urea synthesis is conducted at a pressure in the range of 135–210 atmospheres. Urea synthesis processes in which the process and apparatus of the present invention may be used are disclosed in U.S. Pat. Nos. 3,356,723 and 3,446,601, as well as U.S. patent application Ser. No. 41,163, filed May 25, 1970 which is a continuation of U.S. patent application Ser. No. 631,335, filed Apr. 17, 1967, now abandoned, the disclosures of which are hereby incorporated by reference. These patents and patent applications all disclose the use of wash columns which wash the gases discharged from the head of the urea synthesis autoclave. The apparatus of the present invention may be used in lieu of the wash columns of these patents and patent applications, with advantageous results, using the process of the present invention.

The invention also provides apparatus for the practice of the process described above. This apparatus is a wash column having two portions, a first portion being a gas bubble washer, having a liquid space and an overlying gas space, said portion being provided with a tail gas supply line from the urea synthesis autoclave, a line for discharge of dilute aqueous ammonium carbamate solution installed at a higher level than the aforesaid tail gas supply line, and cooling apparatus for the discharge of heat. The second portion of the wash column is connected with the gas space of the first portion, and contains at least one group of elements to effect intensive gas-liquid contact, and over such group of elements equipment for the supply and distribution of a wash liquid, as well as a washed remnant tail gas discharge line, is installed. The apparatus of this invention includes equipment for the supply and distribution of an inert gas, overlying the aforesaid group of elements, for intensive gas-liquid contact. When mention is made in the present specification of "overlying" or "above" reference is to the direction of the tail gas or residual tail gas stream.

In a preferred embodiment of the process which can be used to practice the aforesaid process, the contact elements for the intensive gas-liquid contact in the second portion of the wash column is at least partially surrounded by a buffer space which is separated from the contact elements by a wall. The aforesaid contact elements have a gas space overlying same, and the buffer space, which is provided with apparatus for supplying inert gas thereto, is connected with the gas space overlying the contact elements through openings in the wall between the buffer space and the contact elements.

The process and use of the apparatus of the present invention are not limited to the treatment of urea synthesis tail gas at synthesis pressure but can also be applied with advantage in urea manufacturing processes wherein inert gas is to be discharged from a lower pressure stage, such as, for instance, from an absorption column or a wash column, in which recovered ammonia and carbon dioxyde are treated.

DESCRIPTION OF THE DRAWINGS

The invention will be more clearly understood with reference to the accompanying drawings wherein:

In FIG. 1, a conventional synthesis autoclave A for the formation of urea discharges a synthesis solution, which generally contains ammonium carbamate, excess ammonia, urea and water through line 1 into the top of stripping column B. In stripping column B, the ammonium carbamate is decomposed into ammonia and carbon dioxide, which are expelled in gaseous form, under the influence of heat and with the aid of carbon dioxide supplied by line 2. The urea solution discharged from stripping column B passes through reducing valve 5 and thereafter is further processed as is known to the art.

The gas mixture leaving the stripping column B, which gas mixture contains some water vapor in addition to ammonia and carbon dioxide, is passed through line 3 to condenser C. In condenser C, wherein cooling is effected to discharge heat, an ammonium carbamate solution is formed which is returned to autoclave A by way of line 4. The synthesis ammonia is fed to autoclave A by way of line 6. A small amount of air or oxygen will be added to the urea process, conveniently by way of an addition to the fresh carbon dioxide, in order to reduce corrosion of process equipment, such as vessels, lines and the like, especially that equipment made of titanium or an austenitic corrosion-resistant steel, or equipment that is lined with these materials.

The inert gases which are supplied to the process, along with fresh ammonia and fresh carbon dioxide, gather in the head of the autoclave A, from which such tail gases are lead through line 7 into the wash column D. In wash column D the inert gases are separated by condensation and absorption from the ammonia, carbon dioxide and water vapor mixed therewith. Subsequently, the inert gases are expanded to atmospheric pressure and discharged through line 16. The ammonia, carbon dioxide and water vapor are recovered in the form of a dilute ammonium carbamate solution which passes from wash column D through line 8 into autoclave A. Alternatively, the dilute ammonium carbamate solution produced in wash column D may be introduced into the condenser C.

According to the present invention, inert gas is introduced into the wash column D in order to reduce the explosive nature of the tail gas.

Figure 1:
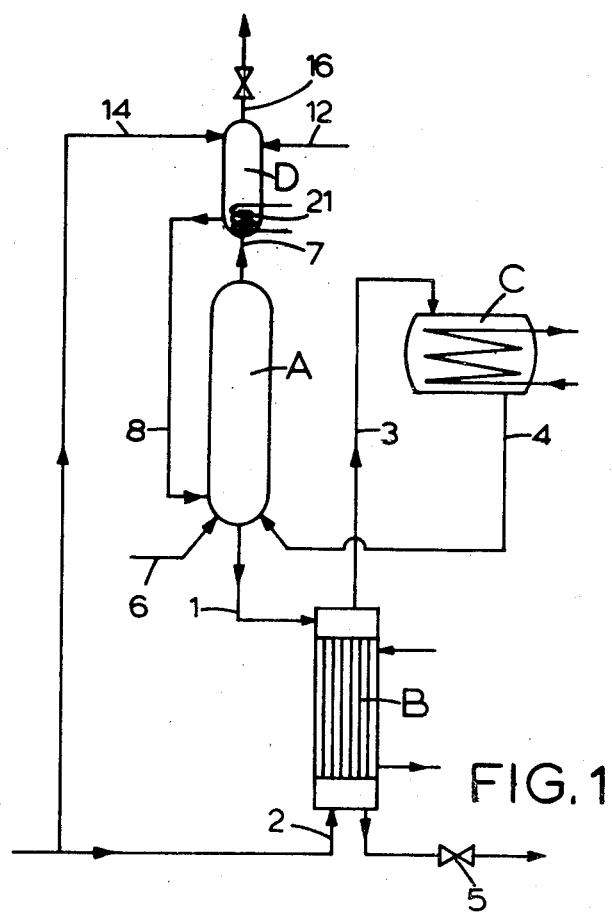
FIG. 1 is a flow diagram for that portion of a urea synthesis process wherein the present invention is utilized.
Figures 2, 3:
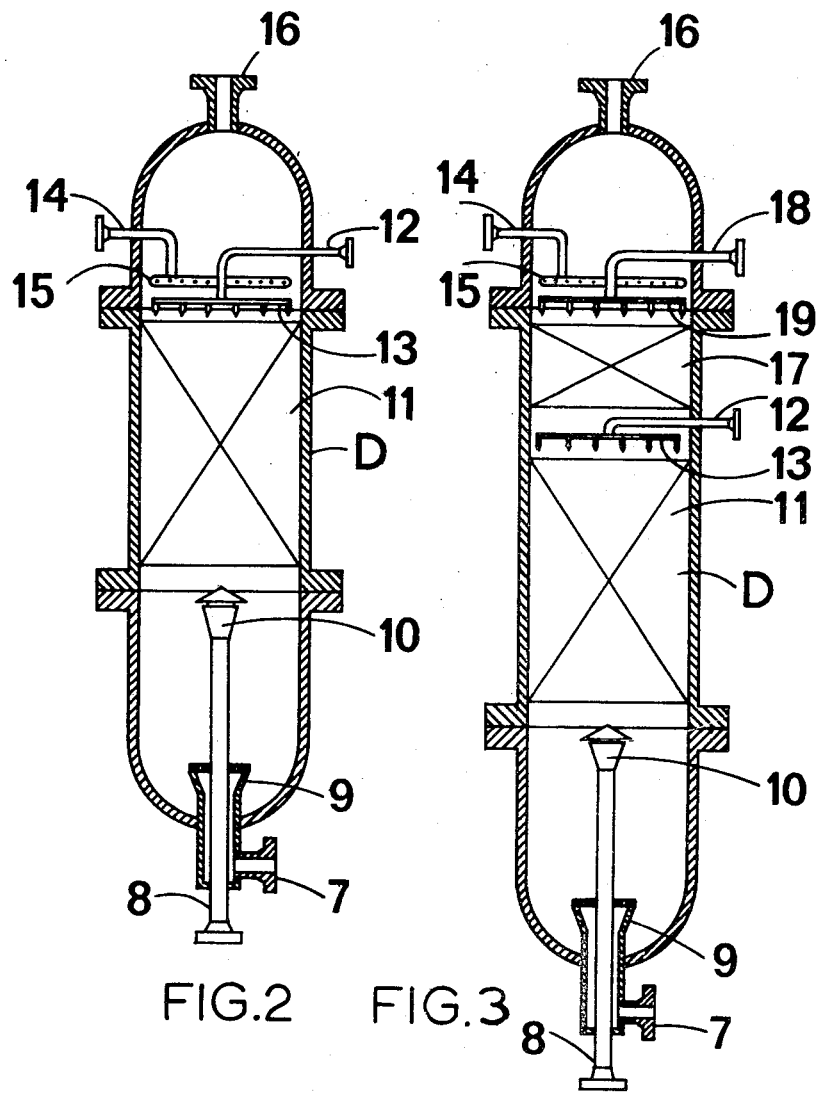
FIG. 2 is a cross section of a wash column of the present invention which can be used in the process of the present invention.
FIG. 3 is a variation of the wash column of FIG. 2.

FIG. 2 illustrates the wash column D OF the present invention in a somewhat simplified form. The synthesis tail gas from the autoclave A (not shown in FIG. 2) is introduced into the bottom of wash column D and below the liquid level therein, by way of line 7 and inlet 9 installed in the bottom of the column. This lower section of wash column D is constructed as a gas bubble washer. The bottom of wash column D is filled with liquid, which is discharged from the column through overflow funnel 10 and discharge line 8. In the liquid, part of the ammonia and carbon dioxide is condensed and absorbed in proportion to the amount of heat removed from the solution or liquid by way of cooling elements (not shown in FIG. 2 for simplicity).

Tail gas passing through the liquid in the bottom section of wash column D ascends through and is washed in a bed 11, packed with suitable material, for instance, Raschig rings, which should be installed as close as possible to the surface of the liquid contained in the bottom of wash column D. Wash liquid is supplied by way of line 12 and distribution device 13 to the top of packed bed 11. Suitable wash liquids include ammonium carbamate solutions, ammonium carbonate solutions, urea solutions or ammonia solutions, which solutions may be obtained in the recirculation section or the concentration section (not shown) of the urea plant. This wash liquid will absorb practically all remaining ammonia and carbon dioxide, with the resulting solution being collected in the lower portion of wash column D, wherein it serves again, as described above, as wash liquid.

During the above two-step washing process in column D, the composition of the gas phase changes, and this change may be in such a manner that the gas phase composition then lies within the explosive range. However, in both washing zones, as well as the small space therebetween, the gas mixture will be divided into gas bubbles or small, component flows which are fully surrounded by liquid, and as a result, it is impossible for explosive reactions to occur at such locations. It will be appreciated that instead of a packed bed, other elements effecting an intensive gas-liquid contact, e.g. sieve plates, can be utilized.

The gas mixture passing through packed bed 11 is immediately mixed with an inert gas, supplied by way of line 14 and distribution device 15, in an amount such that the resulting composition will be completely outside the explosive range. Finally, the gas mixture so diluted with inert gas is discharged from wash column D through outlet 16 and an expansion valve. (not shown)

Any suitable inert gas may be utilized, and mention may be made, by way of example, of air, nitrogen and carbon dioxide. The use of carbon dioxide as an inert gas is preferred. A carbon dioxide compressor is required for the urea synthesis and a slight capacity increase of the compressor will suffice to supply carbon dioxide to wash column D. The use of air or nitrogen would require a separate compressor to bring such gas to the synthesis pressure. In addition, the use of air involves the disadvantage that a larger quantity would have to be supplied in order to obtain the desired dilution than would be the case for the carbon dioxide, for the same tail gas composition. It will be appreciated for this reason higher compression costs would result.

When carbon dioxide is used as the inert gas in wash column D, a portion of the carbon dioxide may dissolved in the wash liquid, and in such event it will be necessary for the quantity of carbon dioxide supplied to the wash column to be increased accordingly in order to obtain the desired degree of dilution.

The total carbon dioxide consumption in the urea synthesis will not be increased because of dissolving of carbon dioxide in the wash liquid, as this carbon dioxide will ultimately reach the synthesis reactor. Of course, a larger quantity of absorption heat will have to be discharged from wash column D.

The absorption of carbon dioxide used for dilution can be limited by maintaining as small as possible a contact surface between the carbon dioxide and the wash liquid and/or by the use of carbamate solutions or carbonate solutions, in which the quantity of ammonia, in excess of the stoichiometric quantity is as small as possible, as the wash liquid.

Another method of reducing the contact surface between the carbon dioxide and the wash liquid is by the use of the apparatus illustrated in FIG. 3. FIG. 3 represents a variation of the wash column of FIG. 2, wherein a second packed bed 17 is installed over the wash liquid distribution device 13. Packed bed 17 is fed a small amount of a second wash liquid which is, for instance, water or a urea solution which is practically free of ammonia, by way of line 18 and distribution device 19. Only very small quantities of carbon dioxide dissolve in the second wash liquid. The second wash liquid flows through packed bed 17 into packed bed 11 and here absorbs, as does the wash liquid supplied through line 12 and distribution device 13, the ammonia still present in the tail gas. Otherwise, the wash column of FIG. 3 treats the tail gas in the same manner as the wash column of FIG. 2, and corresponding numbers are used for corresponding parts.

The quantity of inert gas required to obtain such dilution of the washed tail gas mixture that such mixture is outside the explosive range depends not only upon temperature and pressure but also upon the composition of this gas mixture. For unfavorable conditions, for instance, the required volume of carbon dioxide to be supplied per unit of time may be considerably larger than one-half the volume of the tail gas treated during such period of time. This relatively large volume of carbon dioxide may be objectionable for various reasons including the high cost of compression. In such a case, instead of complete dilution to place the gas mixture outside of the explosive range, partial dilution may advantageously be applied utilizing the apparatus of FIG. 4, which represents yet another and a preferred embodiment of the wash column of FIG. 2.

Figure 4:
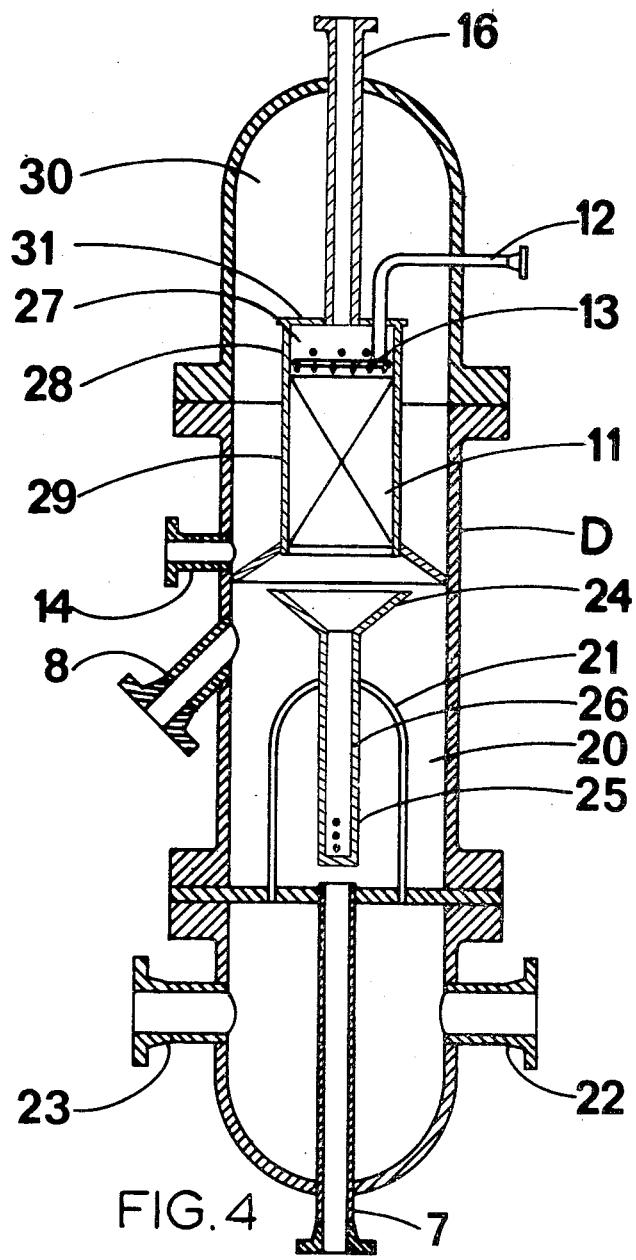
FIG. 4 is a preferred embodiment of the wash column of FIG. 2.

In FIG. 4, the tail gas mixture to be treated is introduced by way of line 7 into the bottom of the liquid compartment 20 of wash column D. Again, condensation and absorption of the major portion of the carbon dioxide and ammonia present in the gas mixture takes place. Heat is removed from liquid compartment 20 by the use of coolant supplied by way of coolant inlet 22, through cooling element 21, and discharged from the wash column by way of coolant outlet 23. The diluted carbamate solution obtained from wash column D is discharged from liquid compartment 20 by way of overflow tube 8. The remaining gas mixture is washed in packed bed 11, which is fed a wash liquid by way of line 12 and distribution device 13. The solution passing through packed bed 11 is collected in funnel 24 and flows into the bottom of liquid compartment 20 by way of tube 26 and holes 25 therein.

It is sometimes advantageous that the distribution device 13 utilize a liquid seal (not shown) in the flow of the wash liquid to the top part of packed bed 11. This liquid seal can be, for instance, a series of overflow weirs. A sparger or other known type of distribution device can be also used.

The gas space 27 above packed bed 11 is defined by shell 29 and cover plate 31. Gas space 27 is connected by means of holes 28 in shell 29 with buffer space 30, which is filled with inert gas fed to gas space 27 by line 14. The volume of buffer space 30 is quite large in comparison to gas space 27, so that in the case of too large a pressure increase occurring in gas space 27, as a result of an explosion in the tail gas remnant which has been rendered only partially inert, with rupturing of shell 29 and/or cover plate 31, this pressure increase can be absorbed by the surround buffer of inert gas without danger of rupturing the outer casing of wash column D. Generally, it will be sufficient if the volume of buffer space 30 is five to 20 times larger than the column of gas space 27, although larger volumes of buffer space 30 may be used if desired. With these differences in volumes of the buffer space 30 and the gas space 27, only such a small amount of inert gas will be necessary, as is sufficient to constantly flush the gas space 27. This amount is appreciably smaller than the quantity required in the case of dilution to an explosion-proof mixture. The diluted tail gas mixture is discharged by way of line 16.

In the operation of the apparatus of FIG. 4, the amount of inert gas which flushes the gas space 27 can be as low as 10 percent, preferably no lower than 20 percent, of the amount required to form a mixture which is outside of the explosive limits. Of course, much larger amounts of the inert gas may be used, but it is generally unnecessary to use amounts greater than 40 percent of the amount required to form a mixture outside of the explosive limits. In any event, while even greater amounts may be used, it is economically unfeasible to use amounts of inert gas which are greater than that amount required to form a mixture outside of the explosive limit. The inert gas is preferably incombustible, and preferably also will not support combustion.

The temperature of the tail gas remnant passing through packed bed 11 and/or packed bed 17 will preferably be in the range of about 90°C to about 170° C. The temperature of the inert gas which is mixed with the remnant tail gas will preferably be within the range of about 80° to 140° C., and the resulting gas mixture will preferably have a temperature of about 80° to 140°C.

EXAMPLES

The invention will be understood more readily by reference to the following examples; however, these examples are intended to illustrate the invention and are not to be construed to limit the scope of the invention. All quantity references in the following examples are based on amount per metric ton of urea produced.

COMPARATIVE EXAMPLE A (Prior Art Process)

The tail gas from the urea synthesis reactor of a urea plant at, a temperature of 180° C, and a synthesis pressure of 140 atmospheres, contains the following components per metric ton of urea produced:

| | |
|---|---|
| Ammonia | 57.4 kg |
| Carbon Dioxide 49.2 kg | |
| Hydrogen | 0.13 kg |
| Oxygen | 2.62 kg |
| Nitrogen | 9.0 kg |
| Water Vapor | 3.6 kg |
| Carbon Monoxide | 0.35 kg |
| Methane | 0.20 kg |

The above ammonia and carbon dioxide were recovered from the tail gas by the prior art process of the British Chemical Engineering article acknowledged above.

First 17.4 kg of ammonia, 44.5 kg of carbon dioxyde and 3.15 kg of water vapor were removed by partial condensation at urea, synthesis pressure. Following an atmospheric pressure absorption, a desorption and absorption at 3 – 4 atmospheres absolute, were effected. The absorption at atmospheric pressure required 2 m$^3$ of cooling water (the temperature increase was 8° C.), the desorption at 3 – 4 atmospheres required 50 kg. of steam, and the absorption at 3 – 4 atmospheres required 2 m$^3$ of cooling water and 30 kg of water for the dissolution of the ammonia and the carbon dioxide. The dilute ammonium carbamate solution obtained was recycled to the synthesis autoclave, which decreased the conversion efficiency, requiring additional ammonium carbamate to be decomposed and the thus liberated ammonia and carbon dioxide to be expelled. This amounted to an additional requirement of about 50 kg. of steam. The 30 kg. of water in the ammonium carbamate solution are, for the most part, carried along by the urea solution to the concentration section of the urea plant. About 30 kg. of steam are needed for the evaporation of this additional water, while the condensation of the discharge vapor requires 2 m$^3$ of cooling water.

Thus, using this prior art process for the recovery of ammonia and carbon dioxide from urea synthesis tail gas, a total of 6 m$^3$ of cooling water and 130 kg. of steam are required per ton of urea produced.

EXAMPLE I

The same tail gas described above for Comparative Example A was absorbed under the urea synthesis pressure according to the present invention, using the apparatus described in FIG. 3. The first wash liquid, fed through line 12 at a rate of 444 kg. per ton of urea and at a temperature of 75° c, was an aqueous ammonium carbamate solution containing 670 g/kg of ammonium carbamate, obtained in the recirculation section of the urea plant, and the second wash liquid, supplied through line 18 at a rate of 3.5 kg. per ton of urea and at a temperature of 90° C., was water. Carbon dioxide was introduced through line 14 at a rate of 75 kg. per ton of urea produced and at a temperature of 100° C. 635 kg of dilute ammonium carbamate solution, containing 770 g/kg of ammonium carbamate, was discharged from the wash column through line 8. 105 kg. of tail gas remnant was discharged through the wash column through line 16.

3.8 m$^3$ of cooling water per ton of urea produced were circulated in the liquid contained in the bottom of the wash column, with the liquid maintained at a temperature of 165° C. Packed beds 11 and 17 contain Raschig rings.

A large portion of the heat of condensation and absorption, now available at a high temperature level, can be used to heat the recirculated ammonium carbamate. solution which is used as absorption liquid, as well as to heat the fresh ammonia fed to the urea synthesis autoclave. Thus the consumption of additional cooling water will be nil, while the use of this liberated heat results in a savings of 20 – 70 kg. of steam per ton of urea. Moreover, it will be appreciated no steam is required for the above-mentioned steps, e.g. absorption and the like, and it follows that the total steam consumption is reduced by 150 – 200 kg. per ton of urea. At the same time, the possibility of an explosive reaction in the head of the wash column is essentially eliminated.

With this complete dilution of the remnant tail gas, the additional energy required to compress the carbon dioxide used as the inert gas amounts to about 10 kWh per ton of urea produced.

EXAMPLE II

The process as described in Example I was repeated with the exception that the wash column of FIG. 4 was used, and the quantity of carbon dioxide was only one-fifth of that used in Example I, to obtain partial dilution of the tail gas remnant. The additional energy consumption for the compression of carbon dioxide amounted to about 2kWh per ton of urea, with the possibilities of explosive reactions reduced and the probability of damage to the shell of the wash column substantially eliminated. The savings in the cooling water and steam requirements amply compensate for the extra cost of compression of carbon dioxide mentioned above.

We claim:

1. In a process for the recovery of ammonia and carbon dioxide from urea synthesis tail gas, said tail gas containing hydrogen and oxygen, said process comprising intensively contacting said tail gas with aqueous media in at least one absorption zone to absorb at least a major portion of the ammonia and carbon dioxide in said tail gas, the improvement comprising immediately mixing the gas mixture leaving said absorption zone with a gas which is inert to the constituents of the tail gas.

2. Process as claimed in claim 1, wherein said mixing is conducted substantially at the urea synthesis pressure.

3. Process as claimed in claim 1 wherein said mixing occurs in a mixing zone which is at least partially surrounded by and in contact with a buffer zone filled with said inert gas.

4. Process as claimed in claim 3, wherein said inert gas is carbon dioxide.

5. Process as claimed in claim 1 wherein the amount of said inert gas mixed with said gas mixture is at least 10 percent of that required to form a resulting gas mixture outside the explosive limits.

6. Process as claimed in claim 3, wherein the volume of said buffer zone is at least five times larger than the volume of said mixing zone.

7. Process as claimed in claim 1, wherein said inert gas is incombustible and will not support combustion.

8. Process as claimed in claim 7 wherein said inert gas is carbon dioxide.

9. Process as claimed in claim 1, wherein the amount of said inert gas mixed with said gas mixture is at least sufficient to form a resulting gas mixture outside explosive limits.

10. Apparatus for the recovery of ammonia and carbon dioxide from hydrogen- and oxygen-containing urea synthesis tail gas, said apparatus consisting of a two-part wash column, one part of the said wash column being gas bubble washer means, said means provided with a gas space, a tail gas supply line from the urea synthesis plant, a liquid discharge line installed at a level above said tail gas supply line, and with cooling devices, the other part of said wash column connected to said gas space having means to effect intensive gas-liquid contact, means for supply and distribution of wash liquid overlying said means to effect said contact, a gas discharge line at a higher level than said means to effect said contact, and means for the supply of inert gas overlying said means to effect said contact.

11. Apparatus as claimed in claim 10, wherein said means for intensive gas-liquid contact contains a second gas space therein, is at least partially surrounded by, and is separated, by a wall, from a buffer space, said buffer space provided with means for supplying gas and connected by way of openings in said wall with said second gas space.

12. Apparatus as claimed in claim 11 wherein the volume of said buffer space is at least five times the volume of said second gas space.

* * * * *